United States Patent [19]

Leeper

[11] Patent Number: 5,478,604
[45] Date of Patent: Dec. 26, 1995

[54] COMPOSITION AND METHOD FOR PREVENTING LEAD INTOXICATION

[75] Inventor: Timothy J. Leeper, Stuart, Va.

[73] Assignee: Actinic, Inc., Greensboro, N.C.

[21] Appl. No.: 255,969

[22] Filed: Jun. 7, 1994

[51] Int. Cl.⁶ .................................................. B05D 7/24
[52] U.S. Cl. .................. 427/397.8; 427/384; 427/412.5; 588/249
[58] Field of Search ................. 427/397.8, 384, 427/412.5; 588/249

[56] References Cited

U.S. PATENT DOCUMENTS

| | | |
|---|---|---|
| 2,745,815 | 5/1956 | Mussell et al. . |
| 2,885,416 | 5/1959 | Costabello et al. . |
| 3,050,552 | 8/1962 | Nemec et al. . |
| 3,134,740 | 5/1964 | Sheetz et al. . |
| 3,252,852 | 5/1966 | Logally et al. . |
| 3,282,851 | 11/1966 | Muehlberg et al. . |
| 3,424,790 | 1/1969 | Bond et al. . |
| 3,425,855 | 2/1969 | Barksdale et al. . |
| 3,471,359 | 10/1969 | Goldstein . |
| 3,475,163 | 10/1969 | Watson . |
| 3,483,149 | 12/1969 | Gresenz et al. . |
| 3,598,777 | 8/1971 | Wade . |
| 3,627,687 | 12/1971 | Teumac et al. . |
| 3,766,299 | 10/1973 | Dornte . |
| 3,859,210 | 1/1975 | Hatch . |
| 3,870,550 | 3/1975 | Mann . |
| 3,872,039 | 3/1975 | Vaughn et al. . |
| 3,935,137 | 1/1976 | Minkoff . |
| 4,005,038 | 1/1977 | Minkoff . |
| 4,064,078 | 12/1977 | Smets et al. . |
| 4,064,316 | 12/1977 | Curtis . |
| 4,067,840 | 1/1978 | Wolf ................................ 260/29.6 R |
| 4,112,191 | 9/1978 | Anderson ............................ 427/333 |
| 4,112,191 | 9/1978 | Anderson . |
| 4,136,043 | 1/1979 | Davis . |
| 4,197,368 | 4/1980 | Davis et al. . |
| 4,241,682 | 12/1980 | Konstadt . |
| 4,246,126 | 1/1981 | Arakelian et al. . |
| 4,413,074 | 11/1983 | Wrasidlo et al. ................. 427/244 |
| 4,477,490 | 10/1984 | Weisberg ......................... 427/397.8 |
| 4,547,350 | 10/1985 | Gesser . |
| 4,652,577 | 3/1987 | Hollander et al. . |
| 4,661,504 | 4/1987 | Hollander et al. . |
| 4,767,619 | 8/1988 | Murray . |
| 4,853,208 | 8/1989 | Reiners et al. ................... 423/659 |
| 4,906,526 | 3/1990 | Inoue et al. . |
| 5,043,370 | 8/1991 | Gowan, Jr. . |
| 5,076,842 | 12/1991 | Frost et al. ....................... 427/388.1 |
| 5,096,946 | 3/1992 | Rainer ............................... 524/30 |
| 5,098,592 | 3/1992 | Narayanan et al. . |
| 5,137,657 | 8/1992 | Boffardi . |
| 5,142,817 | 9/1992 | Rolf . |
| 5,185,313 | 2/1993 | Porath . |
| 5,192,718 | 3/1993 | Danielson . |
| 5,193,936 | 3/1993 | Pal et al. . |
| 5,232,629 | 8/1993 | Boffardi . |
| 5,232,753 | 8/1993 | Cornier . |
| 5,238,583 | 8/1993 | Fortson . |
| 5,248,337 | 9/1993 | Matsubara et al. . |
| 5,266,228 | 11/1993 | Hirozawa et al. . |
| 5,330,794 | 7/1994 | Bosco et al. . |

OTHER PUBLICATIONS

Jonathon Hodgkin, "Chelate–Forming Polymers," Encyclopedia Polymer Science and Engineering, 1985, pp. 363–381, (no month available).

*Primary Examiner*—Diana Dudash
*Attorney, Agent, or Firm*—Cushman Darby & Cushman

[57] ABSTRACT

A coating which contains polyethylene imine, a calcium compound and/or a silicate is applied to a surface which carries a coating of a lead based paint. This reduces the digestion and absorption of lead from the intestinal tract in case the lead based paint is accidentally ingested.

11 Claims, No Drawings

COMPOSITION AND METHOD FOR PREVENTING LEAD INTOXICATION

The present invention relates to a composition containing polyethylene diamine, a calcium compound and/or a silicate and to the use of that composition as a coating for surfaces previously coated with lead based paint.

BACKGROUND OF THE INVENTION

The ingestion of lead, especially by young children, and the consequent lead poisoning, have been a matter of intense public concern for many years. The concern arises from the use of lead, especially lead carbonate, as a pigment. While this practice has long since ceased, old layers of lead paint remain on the walls of many buildings, especially older buildings in large metropolitan areas. These layers of old paint tend to flake off, and there has been widespread concern because of evidence that young children have ingested the resulting paint chips and dust. Measurements have shown elevated levels of lead in such children.

Various proposals have been made of techniques to deal with this issue. For example, there have been proposals to simply remove the layers of lead paint. However, this procedure is expensive, especially because of the need to protect workers engaged in the removal from lead dust. The high cost of removal is difficult to support, especially in impoverished, older neighborhoods of large metropolitan areas.

Another approach is to cover the layers of lead-pigmented paint with a permanent barrier, such as a plastic films, but this also is costly.

There have been proposals for coating the lead-pigmented paint layers with a bad-tasting substance or an emitic, to discourage ingesting the paint or cause it to be expelled if ingested. However, these proposals have not Been accepted.

U.S. Pat. No. 4,067,840 mentions the possible use of chelating agents such as ethylene diamine tetra acetic acid (CaEDTA), 2,3-dimercapto-1-propanol (BAL) and d-penicillamine as a coating on lead-pigmented paints. However, the use of these substances was discouraged because these substances were considered ineffectual and potentially harmful in some circumstances.

U.S. Pat. No. 4,112,191 describes the application of a coating of a lead precipitant on a layer of lead-pigmented paint. Substances mentioned include calcium sulfide, sodium diethyl dithiocarbamate, British Anti-Lewisite (BAL) (dimercaptopropanol), dimercaptosuccinic acid, dihydrothioctic acid, sodium 2,3-dimercaptopropane sulphonate, potassium methyl and ethylxanthates, sodium alginate or pectate, dithiocarbamate based ion-exchange resins, milk, sodium fluoride, sodium sulfate, sodium phosphate, sodium thiocyanate, sodium sulfide, sodium thiosulfate, sodium alkylxanthates, sodium oxalates, sodium silicate, sodium alginate and metallic salts of the dithiocarbamates of polyfunctional amines.

SUMMARY OF THE INVENTION

The present invention provides a composition containing polyethylene imine, a silicate and/or a calcium compound, in aqueous solution which is simply applied as a coating on lead-pigmented paint. If the paint flakes off and is ingested, polyethylene imine, the silicate and/or calcium compound prevents the lead from being dissolved and absorbed in the digestive tract. It is postulated that the coating has the ability to capture lead ions as they migrate through paint chips or paint dust and render them inactive. Therefore, in case of accidental ingestion of lead-pigmented paint, a biological barrier is established and the hazard of lead poisoning is diminished.

The polyethylene imine used in the composition have the formula $H_2N(C_2H_4NH)_xC_2H_4NH_2$, or more generally $(C_2H_5N)_x$, where x is preferably about 25–30. Particularly useful commercially available materials are Epomin SP-012, C.A.S. Number 9002-98-6 and Epomin P1000 which are dissolved in water, at a concentration of about 1 to 25 percent. However, the general category of polyaziridines and poly functional aziridines is useful.

It is useful to also include a surface active agent to assist in penetration and spreading, especially neutral and non-ionic surfactants. Particularly useful materials is the fluorochemical surfactant FC-135 which are the fluoroalkyl quaternary ammonium iodide, C.A.S. Number 1652-63-7 and Bioterge PAS-85.

A particularly useful calcium compound is calcium carbonate.

A particularly useful silicate is an alkali metal silicate, especially potassium silicate. Sodium silicate and colloidal silicates also are useful.

An especially useful composition contains a polyethylene imine, along with calcium carbonate and/or potassium silicate, inasmuch as calcium carbonate and potassium silicate, either alone or in combination, enhance the usefulness of the ethylene imine.

Useful amounts of calcium compound are 1 to 40%, based on the total weight of the coating solution. Useful amounts of silicate are 1 to 30%, based on the total weight of the coating solution.

The toxicity of the coating is low. The $LD_{50}$ of polyethylene imine is 8 g/kg. Given its concentration in the coating, a 25 kg child would have to consume approximately 2500 g of the coating at one sitting for it to be toxic.

This solution may be applied by brushing, spraying or any other method, and then dried, for example by standing at room temperature. It may be applied to windowsills, window frames, banisters, railings, walls, or any other painted surface. The amount applied should be sufficient to form a dry film thickness of 0.3 mil or more.

The invention is illustrated by the following examples.

EXAMPLE 1

Samples of a 0.01 molar lead nitrate solution were mixed with an equal volume of the coating solution described above containing 8% of Epomin P1000 and 2% of Bioterge PAS-85 in distilled water. These samples were titrated with ethylene diamine tetraacetic acid (EDTA) to measure the concentration of lead ions present. The titration procedure was repeated with lead nitrate solution controls. The results are listed in Table 1 and Table 2.

TABLE 1

| | Lead Nitrate solution | | |
|---|---|---|---|
| Sample No. | Vol (ml) Pb (NO$_3$)$_2$ | Vol (ml) EDTA to reach endpoint | Mass (mg) lead |
| 1 | 5 | 5.5 | 11.40 |
| 2 | 5 | 5.5 | 11.4.0 |
| 3 | 5 | 4.7 | 9.74 |

TABLE 1-continued

Lead Nitrate solution

| Sample No. | Vol (ml) Pb (NO$_3$)$_2$ | Vol (ml) EDTA to reach endpoint | Mass (mg) lead |
|---|---|---|---|
| 4 | 5 | 4.5 | 9.32 |
| 5 | 5 | 5.0 | 10.36 |
| 6 | 10 | 10.9 | 22.58 |
| 7 | 10 | 8.8 | 18.23 |
| 8 | 10 | 9.2 | 19.06 |
| 9 | 10 | 9.3 | 19.27 |
| 10 | 10 | 9.5 | 19.68 |
| 11 | 10 | 10.3 | 21.34 |

Average mass of lead (mg) = 15.67

TABLE 2

Polyethylene imine treated lead nitrate solution

| Sample No. | Vol (ml) 50/50 Pb(NO$_3$)$_2$/ Polyethylene imine | Vol (ml) EDTA to reach endpoint | Mass (mg) lead |
|---|---|---|---|
| 1 | 5 | 2.5 | 5.18 |
| 2 | 5 | 1.4 | 2.90 |
| 3 | 5 | 1.5 | 3.11 |
| 4 | 5 | 1.8 | 3.73 |
| 5 | 5 | 2.0 | 4.14 |
| 6 | 5 | 1.4 | 2.90 |
| 7 | 5 | 1.5 | 3.11 |
| 8 | 10 | 5.3 | 10.98 |
| 9 | 10 | 3.4 | 7.04 |
| 10 | 10 | 3.3 | 6.83 |
| 11 | 10 | 3.4 | 7.04 |
| 12 | 10 | 4.6 | 9.53 |
| 13 | 10 | 3.7 | 7.66 |
| 14 | 10 | 2.9 | 6.01 |

Average mass of lead (mg) = 5.73

The data shows that the coating solution reduced the amount of available lead ions in solution by 63.5%.

EXAMPLE 2

Samples of lead-pigmented paint chips were treated with the polyethylene imine solution used in Example 1 and then soaked in distilled water. Control samples of lead pigmented paint chips were also soaked in distilled water. 5 ml samples of the water were then titrated with 0.01 molar EDTA to measure the amount of lead ions which had leached into the distilled water. The results are given in Tables 3 and 4.

TABLE 3

Untreated Lead Paint Chips

| Sample No. | Vol (ml) EDTA to reach endpoint | Mass (mg) lead |
|---|---|---|
| 1 | 0.9 | 1.86 |
| 2 | 0.4 | 0.83 |
| 3 | 0.2 | 0.41 |
| 4 | 0.1 | 0.21 |
| 5 | 0.3 | 0.62 |
| 6 | 0.1 | 0.21 |

Average mass of lead (mg) = 0.69

TABLE 4

Treated Lead Paint Chips

| Sample No. | Vol (ml) EDTA to reach endpoint | Mass (mg) lead |
|---|---|---|
| 1 | 0.2 | 0.41 |
| 2 | 0.2 | 0.41 |
| 3 | 0.1 | 0.21 |
| 4 | 0.1 | 0.21 |
| 5 | 0.1 | 0.21 |
| 6 | 0.1 | 0.21 |

Average mass of lead (mg) = 0.28

The data shows that the treated paint chips released only 40% of the amount of lead as the untreated paint chips, demonstrating a 60% reduction.

EXAMPLE 3

Samples of a 0.01 molar solution of lead nitrate were titrated with the coating solution of Example 1 to determine the amount of polyethylene imine needed to react with the lead ions. The results are given in Table 5.

TABLE 5

| Sample No. | Vol (ml) Pb (NO$_3$)$_2$ | Vol (ml) coating solution to reach end point |
|---|---|---|
| 1 | 5 | 7.2 |
| 2 | 5 | 5.8 |
| 3 | 5 | 5.4 |
| 4 | 5 | 4.9 |
| 5 | 5 | 4.2 |
| 6 | 5 | 5.5 |

Average mass of lead (mg) = 5.5

The data shows that polyethylene imine absorbs approximately 25 lead ions per molecule.

EXAMPLE 4

Samples of untreated lead paint chips were soaked in distilled water. 5 ml samples of the water were titrated with 0.01 molar EDTA to measure the amount of lead ions present. The procedure was repeated with lead paint chips which had been misted with the coating solution of Example 1. The results are given in Tables 6 and 7.

TABLE 6

Untreated Lead Paint Chips

| Sample No. | Vol (ml) EDTA to reach endpoint | Mass (mg) lead |
|---|---|---|
| 1 | 0.6 | 1.24 |
| 2 | 0.5 | 1.04 |
| 3 | 0.5 | 1.04 |
| 4 | 0.8 | 1.68 |
| 5 | 0.6 | 1.24 |

Average mass of lead (mg) = 1.25

TABLE 7

Treated Lead Paint Chips

| Sample No. | Vol (ml) EDTA to reach endpoint | Mass (mg) lead |
| --- | --- | --- |
| 1 | 0.4 | 0.48 |
| 2 | 0.6 | 1.24 |
| 3 | 0.4 | 0.83 |
| 4 | 0.5 | 1.04 |
| 5 | 0.3 | 0.62 |

Average mass of lead (mg) = 0.91

The data shows that the treated paint chips released only 72% of the amount of lead as the untreated paint chips, demonstrating a 27% reduction.

EXAMPLE 5

The effectiveness of the coating and an encapsulant product were tested in vivo in adult rats with an average weight of 404.5 grams. The rats were housed in glass aquariums and fed a diet of lab blocks and water prior to testing. Once the study began, the rats were fed measured amounts of food each day. The amount of the test substance added to the food was approximately 10% of the diet. At the end of the five day feeding cycle, the animals were sacrificed and blood samples were drawn. The blood lead levels are shown in Table 8.

TABLE 8

| Rat Group | Daily Dosage | Lead Consumed(g) | Blood Lead Level (ug/dL) | ug/dL/g | Efficacy |
| --- | --- | --- | --- | --- | --- |
| 1 | Lead carbonate | 1.925 | 486 | 252.5 | 0% |
| 2 | Lead carbonate with encapsulant[1] | 1.665 | 175 | 105.1 | 58% |
| 3 | Lead carbonate with coating[2] | 2.4 | 147 | 61.3 | 76% |
| 4 | Pure food | 0 | 0 | 0 | 100% |

[1] commercially available lead encapsulant
[2] 8% Epomin P-1000, 2% Bio-Terge PAS-85, 90% distilled water
*Post mortem examination of the rat in group 2 showed an intestinal blockage.

The following conclusions can be drawn from these results:

(1) Lead carbonate in the diet, even in small amounts, causes a high blood level of lead.

(2) Treatment of lead carbonate with the coating causes a marked decrease in the blood lead level of the rats tested.

(3) Treatment of lead carbonate with the commercially available encapsulant does not cause as much of a decrease as the coating and also causes intestinal blockage.

EXAMPLE 6

Similar tests were performed with potassium silicate and calcium carbonate. The effectiveness of the coating was determined by testing on rats. The rats were housed in glass aquariums and fed a diet of lab blocks and water, prior to testing. Once the study began, the rats were fed measured amounts of food each day. The amount of the test substance added to the food varied, due to the different formulations, while the amount of lead remained constant. Approximately 24 hours later, the rats were sacrificed and blood samples were drawn. The samples were tested by an independent laboratory. The blood levels are shown in

TABLE 9

| Rat Group | Daily Dose | Blood Lead μg/dL |
| --- | --- | --- |
| 1 | Lead carbonate | 189 |
| 2 | Lead carbonate with coating of Example 1 | 91 |
| 3 | Lead carbonate with coating (potassium silicate formula)[1] | 71 |
| 4 | Lead carbonate with coating (calcium formula)[2] | 30 |
| 5 | Lead coating with (silicate and calcium formula)[3] | 15 |

[1] 7.5% Epomin P1000, 2.0% Bioterge PAS-85, 5% potassium silicate, 85.5% distilled water.
[2] 6% Epomin P1000, 2% Bioterge PAS-85, 10% calcium carbonate, 82% distilled water.
[3] 7% Epomin P1000, 2% Bioterge PAS-85, 4% potassium silicate, 9% calcium carbonate, 78% distilled water.

From these results, the following conclusions can be drawn:

(1) The coating reduced lead absorption by 52% into the bloodstream of the rats.

(2) The potassium silicate and calcium additives reduced lead absorption by 92% and performed well in conjunction with the base coating formula.

What is claimed is:

1. A method of reducing the hazard of lead poisoning which comprises applying a coating solution to a surface that contains a lead-based paint, said coating solution comprising an effective amount of polyethylene imine, wherein said effective amount is sufficient to reduce said lead poisoning hazard relative to said lead poisoning hazard when said coating solution is not applied.

2. A method as set forth in claim 1 in which said coating solution also comprises at least one member selected from the group consisting of calcium compounds and silicates.

3. A method as set forth in claim 2 in which said calcium compound is calcium carbonate.

4. A method as set forth in claim 2 in which said silicate is an alkali metal silicate.

5. A method as set forth in claim 2 in which said coating solution comprises both calcium carbonate and potassium silicate.

6. A method as set forth in claim 1 in which said polyethylene imine is represented by the formula:

$$(C_2H_5N)_x$$

wherein X is between about 25–30.

7. A method as set forth in claim 1 in which said amount of polyethylene imine is between about 1–24 wt %, based on the total weight of said coating solution.

8. A method as set forth in claim 1 in which said coating solution also comprises a surfactant.

9. A method as set forth in claim 8 in which said surfactant is a fluorochemical surfactant.

10. A method as set forth in claim 2 in which the concentration of said calcium compound is between about 1–40 wt % based on the total weight of said coating solution.

11. A method as set forth in claim 2 in which the concentration of said silicate is between about 1–30 wt % based on the total weight of said coating solution.

* * * * *